Sept. 15, 1942.  W. LEATHERS  2,295,534
AUTOMATIC METER-READING APPARATUS
Filed Aug. 2, 1940  2 Sheets-Sheet 1

INVENTOR.
Ward Leathers
By
atty

Sept. 15, 1942.  W. LEATHERS  2,295,534
AUTOMATIC METER-READING APPARATUS
Filed Aug. 2, 1940  2 Sheets-Sheet 2

INVENTOR
Ward Leathers
By
atty

Patented Sept. 15, 1942

2,295,534

UNITED STATES PATENT OFFICE 2,295,534

AUTOMATIC METER-READING APPARATUS

Ward Leathers, Brooklyn, N. Y., assignor, by mesne assignments, to International Business Machines Corporation Application August 2, 1940, Serial No. 349,981

1 Claim. (Cl. 177—353)

The present invention relates to electronic telemetric apparatus wherein a primary physical change at one location is accompanied by a response at a remote location wherein a secondary operation is performed. The invention has particular reference to an electronic mechanism wherein an indicator is positioned, a counter is actuated, a recording is produced, or some other recording operation, is carried out in accordance with a physical change such as the movement of a cyclometer wheel in a metering device.

The improved telemetric system comprising the present invention, while primarily designed for use in obtaining distant readings or recordings of a meter dial indication, may also, by modification thereof, be utilized for the electronic transmission of readings of meteorologist and other scientific instruments to a remote point and for the recording of those readings in various ways at regular or irregular intervals.

An object of the invention is to provide an electronic remote metering system which will be entirely free from errors caused by tube deterioration, variation in tube characteristics or in line resistance.

The electronic means of numeral discrimination encompassed by this invention are especially useful with that type of telemeter reading wherein ten resistors of differing values respectively correspond to the Arabic numerals 0 to 9 in the meter. Accordingly, it is a further object of the present invention to provide an electronic discriminator control device wherein one of a plurality of circuits corresponding to the various resistors employed in the meter may be electronically selected and closed as nearly instantaneously as possible in order that a corresponding numeral indicated by the meter may be relayed to the central station for recording purposes.

In the accompanying drawings forming part of this application two embodiments of the invention have been disclosed for illustrative purposes. In these drawings.

Figure 1:
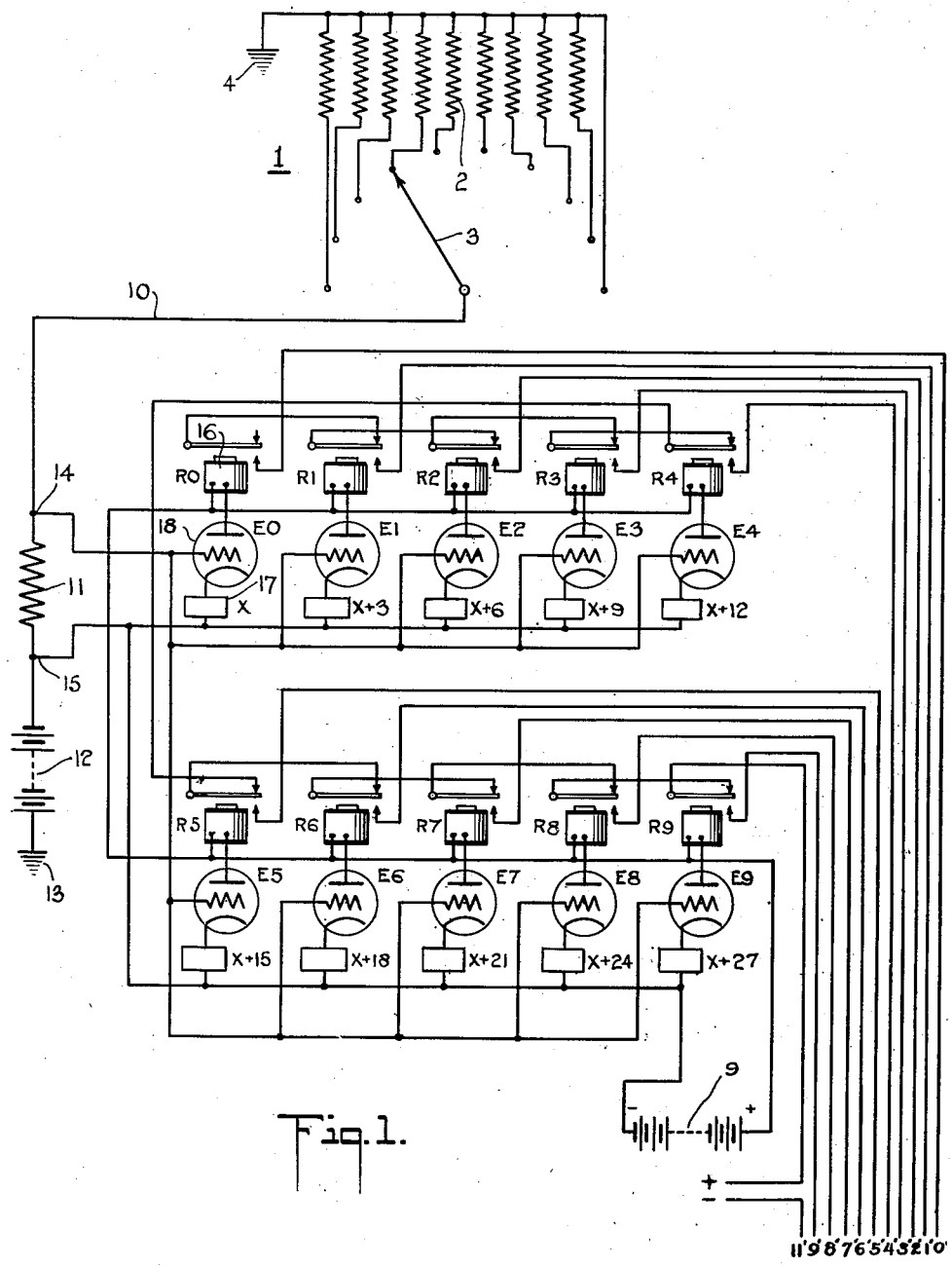
Figure 1 is a schematic electric diagrammatic view showing ten resistors representing various dial indications on readings set up in a meter and ten electronic tubes with their associated circuits for numeral discrimination in a reading board at a central station.

Referring now to Figure 1, a series of resistors 2 are arranged electrically in parallel in a reading circuit and are adapted to be positively and selectively introduced into the circuit by means of a switch arm 3 operated in timed relation to a cyclometer wheel or the like in a metering apparatus. Each resistor 2 of the series in the meter, has one of ten values. Each of these values will produce a different potential in the long line 10 of the impedance circuit which comprises ground 4, resistor 2, arm 3, line 10, resistor 11, battery 12, and ground 13. These potentials are due to the relationship of the resistor 2 to the fixed resistor 11 and the voltage produced by battery 12. The ratio of the value of resistor 11 to the sum of the values of 11 and 2 is the fraction of the voltage of battery 12 that will appear between the wire junctures 14 and 15. Substitution of different resistors 2 in the impedance circuit varies the ratio, thus varying the voltage drop that occurs across the resistor 11. These voltage variations must be discriminated from one another, and each must actuate one of the ten relays R0 to R9. This discrimination is accomplished by the use of ten electronic reading circuits, one for each of the ten Arabic numerals, each complete with a vacuum tube 18 and a sensitive relay 16. The grid of each successive tube is more negative than the previous one by a predetermined voltage (as, for example, three volts) because of the bias placed upon the tube by the battery 12 and resistor 17. Each sensitive relay is disposed in the plate circuit of one of the tubes and each is mechanically biased or adjusted to operate when a predetermined minimum amount of plate current flows in its respective circuit, this current being the same in all ten circuits. The plate current of a tube is dependent upon the grid voltage with respect to cathode voltage, i. e. the more positive the grid, the more plate current—the more negative the grid, the less the plate current. Plate voltage for tubes 18 is supplied by battery 9. The voltage intervals of the ten different values of resistors 2 may then be three volts. The voltages which appear at junction 14 are impressed upon the grids of all the tubes. These voltages tend to make the grids positive. If the relays are adjusted to operate when the grid voltage is zero, then, in order to function, the negative bias on the grid must be overcome. This is taken care of by the positive voltage that is impressed on the grids by the impedance circuit. The positive voltage produced by this circuit, when for example the numeral 4 in the meter is being read, will be of such value that it will algebraically add up with the normal negative bias of the grid of the tube E4 to give zero volts on the grid. This will operate the relay R4. At the same time, however, this same voltage has also caused relays R0, R1, R2 and R3 to operate. The grids of the tubes corresponding to these relays are also positive enough to cause their relays to operate. The grid of the tube in the circuit E5 was made positive until it became three volts negative of zero which is not sufficient to operate the relay R5. Relay R4 is the only one whose output circuit is closed because relay R4 automatically breaks the output circuits of R3, R2, R1 and R0 when it operates. The numeral 4 on the meter indicator or cyclometer in the meter has been read and now, by means of electronic discrimination, a circuit corresponding to the numeral 4 has been closed in the central reading station whereby recording in any desirable manner may be effected.

Figure 2:
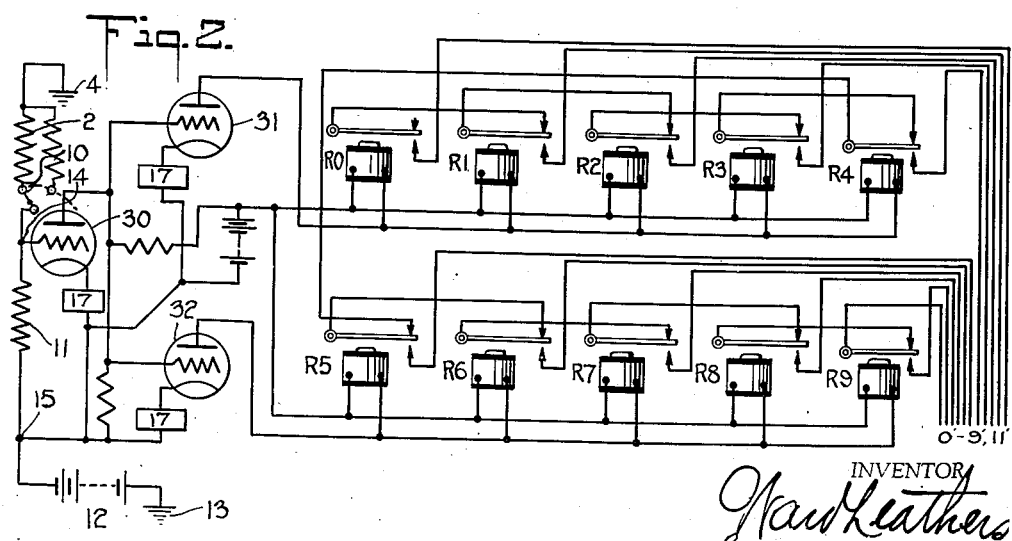
Figure 2 is a diagrammatic view similar to Figure 1 showing an additional amplifying stage for each of two sets of selective relays of five each.

A further modification is found in Fig. 2. Instead of one tube and one electronic circuit discriminating between ten relays, there is one tube and one circuit discriminating between two groups of five relays each, two tubes 31 and 32 and their circuits, each of which discriminate between five relays. The tube 30 amplifies the three volt variations from point 14 to fifteen volt variations. These fifteen volt differentials are fed to the grids of tubes 31 and 32. Tube 31 is biased so that it will respond to the first five fifteen-volt differentials. Relays R0 to R4 are in the plate circuit of 31 and each is adjusted to operate at one of the five differentials. Tube 32 is biased so that it will respond to the last five fifteen-volt differentials. Relays R5 to R9 are in the plate circuit of 32 and each is adjusted to operate at one of the five differentials. Tube 32 is biased seventy-five volts more negative than is 31. Therefore it is found that both R0 and R5 are adjusted to operate at the same value of plate current. Each of them is, however, in the plate circuit of a different tube and the tubes are differently biased so that the voltage at 14 will not actuate the relay R6 if it is intended for relay R1. Relays R0, R1, R2, R3, R4 and R5 will also operate along with relay R6 when the voltage at 14 is intended for relay R6. Relay R6, however, is the only relay whose output circuit is completed because when it operates it automatically breaks the output circuits of relays R0, R1, R2, R3, R4 and R5 as heretofore described. The advantage in this system lies in the fact that instead of having one tube actuate one of ten relays, there is one tube amplifying the normal differential and two tubes discriminating among five relays each. Thus, instead of having one tube discriminate between ten voltages one tube has to discriminate only between five that are farther apart and, therefore, more distinct. This will reduce error in reading due to slight variations in voltage and current.

What is claimed is:

In an apparatus for discriminating against the transmission of voltage impulses of certain amplitudes in favor of the transmission of voltage impulses of slightly higher and lower amplitudes, a plurality of normally open circuits, a circuit closing device for each circuit, said devices being sequentially arranged in series and each normally maintaining its respective circuit open and operable upon actuation thereof to close the same and open the circuit controlled by the device immediately preceeding it in the series, a solenoid for actuating each device, said solenoids being arranged in two groups, the solenoids of each group requiring current of progressively increasing strength for their operative energization, an electronic circuit including a multi-element current regulating vacuum tube for each group of solenoids, the solenoids of each group being connected in the plate-cathode or output circuit of its respective tube, an amplifying tube having an input circuit and an output circuit connected in parallel to the grid-cathode or input circuit of said other tubes, means including a single current source for applying a direct current potential to the plates of all of said tubes, means for selectively applying current of varying voltage to the input circuit of the amplifying tube, and means including a single current source for negatively biasing the grids of all of said tubes and for biasing one of said current regulating tubes so that the latter will respond to a different range of voltage application from the other current regulating tube.

WARD LEATHERS.